United States Patent
Edge

(10) Patent No.: US 7,710,597 B2
(45) Date of Patent: May 4, 2010

(54) MODIFIED NEUGEBAUER MODEL FOR HALFTONE IMAGING SYSTEMS

(75) Inventor: Christopher J. Edge, St. Paul, MN (US)

(73) Assignee: Eastman Kodak Company, Rochester, NY (US)

(*) Notice: Subject to any disclaimer, the term of this patent is extended or adjusted under 35 U.S.C. 154(b) by 1324 days.

(21) Appl. No.: 10/883,006

(22) Filed: Jul. 1, 2004

(65) Prior Publication Data

US 2005/0036163 A1 Feb. 17, 2005

Related U.S. Application Data

(60) Provisional application No. 60/484,028, filed on Jul. 1, 2003.

(51) Int. Cl.
*G06F 15/00* (2006.01)
*G06K 9/00* (2006.01)

(52) U.S. Cl. ............ 358/1.9; 358/3.12; 358/3.23; 358/3.24; 358/3.26; 358/3.27; 358/504; 358/534; 382/162; 382/164; 382/166; 382/167

(58) Field of Classification Search ............ 358/1.9, 358/3.12, 3.25, 3.26, 504, 534, 518, 527, 358/3.23, 2.1, 3.06, 3.09, 3.3, 515, 519, 520, 358/3.24, 3.27; 382/276, 270, 162, 165, 382/166, 167, 164; 101/181, 365, 483; 356/394

See application file for complete search history.

(56) References Cited

U.S. PATENT DOCUMENTS 5,315,380 A * 5/1994 Ingraham et al. ............ 358/500
5,357,448 A    10/1994 Stanford
5,416,613 A *  5/1995 Rolleston et al. ............ 358/518

(Continued)

FOREIGN PATENT DOCUMENTS

| EP | 0 648 042 A | 4/1995 |
| EP | 0 703 700 A | 3/1996 |
| EP | 1 083 739 A | 3/2001 |

OTHER PUBLICATIONS

Klaman, Aspects on Colour Rendering, Colour Prediction and Colour Control in Printed Media, 2002, Doctoral Dissertation, Royal Institute of Technology.*

(Continued)

*Primary Examiner*—King Y Poon
*Assistant Examiner*—Steven Kau
(74) *Attorney, Agent, or Firm*—Nelson Adrian Blish

(57) ABSTRACT

A technique for profiling a color printing device employs a modified Neugebauer color mixing model. The modeling technique makes use of a variable dot gain value and "n factor." The variable dot gain adjustment value may vary according to the particular tristimulus channel under evaluation. In addition, the variable dot gain value may vary according to the particular Neugebauer primary over which a halftone dot is printed. Accordingly, the technique may rely on an array of different dot gain values and n factors that correspond to different combinations of color channels and overprint conditions. As a further feature, the techniques may rely on a dot gain formula that relates halftone dot variation, i.e., fringe thickness, to the size of the halftone dot. This relationship tends to produce a dot gain model that more closely resembles the actual dot gain behavior on a printing press.

8 Claims, 10 Drawing Sheets

U.S. PATENT DOCUMENTS

| | | | |
|---|---|---|---|
| 5,526,140 A | | 6/1996 | Rozzi |
| 5,606,432 A | * | 2/1997 | Ohtsuka et al. ............. 358/527 |
| 5,967,050 A | * | 10/1999 | Seymour .................... 101/484 |
| 6,072,588 A | * | 6/2000 | Dohnomae .................. 358/1.9 |
| 6,241,339 B1 | * | 6/2001 | Kondo ......................... 347/43 |
| 6,256,051 B1 | * | 7/2001 | Asada et al. ................ 347/131 |
| 6,320,676 B1 | * | 11/2001 | Yoshidome ................. 358/1.9 |
| 6,341,175 B1 | | 1/2002 | Usami |
| 6,525,838 B1 | * | 2/2003 | Nagae et al. ............... 358/3.01 |
| 7,116,447 B2 | * | 10/2006 | Braun et al. ............... 358/3.12 |

OTHER PUBLICATIONS

Zeng et al, An Expanded Neugebauer Model for Printer Color Formation, January, 19999, Part of IS&SPIE Conference on Color Imaging, SPIE vol. 3648.*

A. Ufuk Agar, "A Spectral Model for Halftone Color Prediction," Hewlett-Packard Laboratories, Palo Alto, CA, 4 pgs, 2000.

David R. Wyble and Roy S. Berns, "A Critical Review of Spectral Models Applied to Binary Color Printing," John Wiley & Sons, Inc., vol. 25, No. 1, Feb. 2000, pp. 4-19.

Joseph M. Janiak, Thesis, "Wavelength Dependence of the Yule-Nielson Factor," Center for Imaging Science Rochester Institute of Technology, 1999.

J.A. Stephen Viggiano, "Modeling the Color of Multi-Colored Halftones," XP002304951, www.acolyte-color.com/papers/1990_TAGA.pdf>, 1990.

Henry R. Kang, "Applications of Color Mixing Models to Electronic Printing," Journal of Electronic Imaging 3(3), pp. 276-287, Jul. 1994.

International Search Report, PCT/US2004/021198, 4 pgs., dated Nov. 19, 2004.

* cited by examiner

MODIFIED NEUGEBAUER MODEL FOR HALFTONE IMAGING SYSTEMS

This application claims the benefit of U.S. provisional application No. 60/484,028, filed Jul. 1, 2003, the entire content of which is incorporated herein by reference.

FIELD

The invention relates to color imaging and, more particularly, to techniques for modeling halftone imaging systems.

BACKGROUND

A variety of techniques exist to model the color response of a halftone imaging device. Accurate modeling is important in achieving reliable, consistent color output from the imaging device. In particular, the model can be used to formulate device profiles. A device profile, such as an International Color Consortium (ICC) profile, permits generation of a color map defining device drive values based on image data so that the device produces an accurate representation of the color image defined by the image data. Notably, a model can reduce the need for extensive empirical color correction. In some cases, for example, a change in the physical characteristics of an imaging device can be accommodated by incremental adjustments to the model, rather than empirical measurements, which can be labor- and time-intensive.

One well known spectral modeling technique is the Neugebauer color mixing model. The Neugebauer model characterizes spectral reflectance in terms of a weighted sum of reflectances obtained from one-, two- and three-color combinations of available colorants and a substrate on which the colorants are formed. The resulting colorant combinations are referred to as the Neugebauer primaries. In a three-color system, e.g., having cyan, magenta, yellow (CMY) colorants, there are eight Neugebauer primaries. In a four-color system, e.g., having cyan, magenta, yellow, black (CMYK) colorants, there are sixteen Neugebauer primaries.

The Neugebauer model is widely used in the graphic arts industry to characterize the color response of halftone printing devices. However, certain modifications to the Neugebauer model have been developed over the years to enhance accuracy. For example, existing implementations of the Neugebauer model typically incorporate a dot gain value that characterizes differences between theoretical halftone dot size and the actual dot size that is produced upon transfer of a colorant from a printing plate to paper.

In addition, many Neugebauer implementations take into account the penetration of light into paper, and characterize this effect in terms of the Yule-Nielson "n factor." Initially, the penetration represented by the n factor was expressed as a function of wide band reflectance. More recently, the n factor has been expressed in terms of narrow-band spectral curves.

SUMMARY

In general, the invention is directed to a technique for profiling a color printing device according to a modified Neugebauer color mixing model. The modified Neugebauer color mixing model makes use of a variable dot gain value as well as a variable n factor. The dot gain value and n factor are varied according to the particular Neugebauer primaries produced by the color channels and the particular tristimulus components under evaluation, e.g., XYZ or RGB.

The variable dot gain value may vary according to the particular Neugebauer primary over which a halftone dot is printed. Accordingly, the technique may rely on an array of different dot gain values that correspond to different combinations of color channels and overprint conditions, rather than a single dot gain adjustment factor for all channels and conditions. Similarly, different n factors may be determined for the single-colorant Neugebauer primaries for each tristimulus channel, e.g., XYZ or RGB.

As a further feature, the techniques may rely on a dot gain formula that relates halftone dot variation, i.e., fringe thickness, to the size of the halftone dot, instead of assuming a constant fringe thickness for dots of all sizes. This relationship tends to produce a dot gain model that more closely resembles the actual dot gain behavior on a printing press.

In one embodiment, the invention provides a method comprising determining different dot gain values for single-colorant Neugebauer primaries and multi-colorant Neugebauer primaries for each tristimulus color component, and calculating tristimulus color values based on the different dot gain values to characterize a color response of a halftone imaging device.

In another embodiment, the invention provides a method comprising determining a dot gain value as a function of the size of a halftone dot, wherein the dot gain value is directly proportional to the size of the halftone dot, and generating a profile based on the dot gain value to characterize the color response of a halftone imaging device.

In an added embodiment, the invention provides a method comprising determining a dot gain value by applying an n factor to the dot gain value, and generating a profile based on the dot gain value that characterizes the color response of a halftone imaging device.

In a further embodiment, the invention provides a method comprising determining Neugebauer primaries for combinations of colorant channels applied by a halftone color imaging device, determining different dot gain values for single-colorant Neugebauer primaries and multi-colorant Neugebauer primaries for each tristimulus channel, determining different n factors for the single-colorant Neugebauer primaries for each tristimulus channel, and determining dot gain corrections to the dot gain values for the single-colorant Neugebauer primaries when printing on the remaining single and multi-colorant Neugebauer primaries.

The invention can provide a number of advantages. For example, a color profiling technique in accordance with the invention is capable of characterizing the color response of a color imaging device in such a manner as to achieve both accuracy and smoothness. The technique makes use of a modified Neugebauer model that permits accurate and smooth characterization for a variety of different measurement data sets. In other words, the technique does not require a particular measurement data set for effective operation.

In some cases, the invention may make it possible to construct a physically based model that has the ability to predict tristimulus values for a halftone imaging device to a degree of accuracy comparable to the expected error caused by uncertainties in the measurement data. In these cases, models that provide a good fit to the measurement data can be obtained without the inherent risks involved in overfitting the data, i.e., making corrections to noise rather than real device behavior.

Also, constructing a device model without the need for empirical corrections permits the creation of virtual device models that can adapt to small but significant changes such as changes in dot gain, changes in overprint characteristics, or the like. In this manner, changes can be accommodated by adjustments to device model parameters, rather than empirical measurements, which can be labor- and time-intensive.

Additional details of these and other embodiments are set forth in the accompanying drawings and the description below. Other features, objects and advantages will become apparent from the description and drawings, and from the claims.

DETAILED DESCRIPTION

Figure 1:
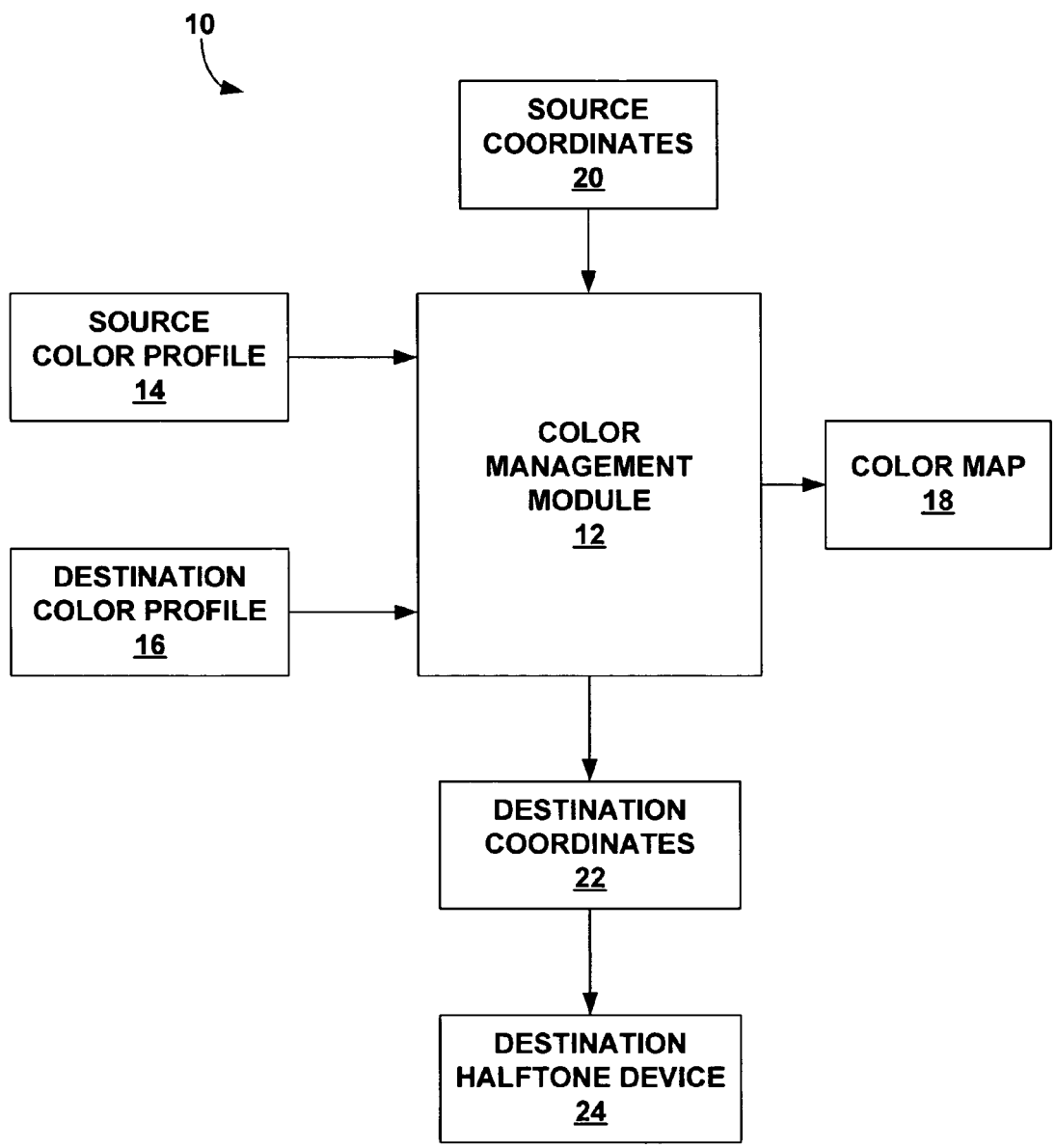
FIG. 1 is a block diagram illustrating a color management system.

FIG. 1 is a block diagram illustrating a color management system 10. Color management system 10 may be realized by a computer or computer workstation programmed to process and manipulate color image data. As shown in FIG. 1, system 10 includes a color management module 12 that applies a source device profile 14 and a destination device profile 16 to produce a color map 18 for formulation of a device link between color imaging devices. Color management module 12 uses color map 18 to link source device coordinates 20 to destination device coordinates 22 to drive a destination halftone imaging device 24, such as a printer or printing press.

Color management system 10 may include a color profiler (not shown) to generate device profiles 14, 16. Alternatively, the color profiler may be included within a separate device or system. The color profiler implements a color profiling technique that employs a modified Neugebauer color mixing model, in accordance with an embodiment of the invention, to characterize respective imaging devices and generate one or both of device profiles 14, 16. Device profiles 14, 16 may correspond to ICC profiles, as specified by the International Color Consortium (ICC), and serve to characterize the color responses of respective imaging devices.

In accordance with an embodiment of the invention, the color profiler implements a modified Neugebauer color mixing model that makes use of a variable dot gain value to represents a difference between theoretical halftone dot size and the actual dot size that is produced upon transfer of a colorant from a printing plate to a substrate, such as paper. In addition, the modified Neugebauer color mixing model makes use of a variable Yule-Nielson "n factor" to quantify the degree of penetration of light into the substrate on which the colorants are formed.

In effect, the modified Neugebauer model applies a simple n factor correction to the individual color channels, e.g., CMYK, in conjunction with a dot gain adjustment. This result can be achieved using simple Neugebauer equations in conjunction with dot gains and n factors that are uniquely adjusted for the tristimulus components of the vector produced from the Neugebauer equations. In this manner, the model may take into account different dot gain characteristics and different degrees of light penetration for individual combinations of tristimulus components, Neugebauer primaries and overprint conditions.

For example, the dot gain value and n factor may vary according to the particular tristimulus color component under evaluation, e.g., X, Y, Z or R, G, B, as well as vary according to the particular Neugebauer primary over which a halftone dot is printed. A CMY system, as an example, will produce eight Neugebauer primaries: paper, cyan, magenta, yellow, red, green, blue, and three-color overprint. Accordingly, the technique may rely on an array of different dot gain values and n factor values that correspond to respective combinations of color channels, e.g., CMY or CMYK, and overprint conditions, rather than a single dot gain adjustment factor and n factor for all channels and conditions.

In addition, the color profiler implements a dot gain formula that relates halftone dot variation, i.e., fringe thickness, to the size of the halftone dot, instead of assuming a constant fringe thickness for all dot sizes. This relationship tends to produce a dot gain model that more closely resembles actual dot gain behavior on a printing press. The color profiler may also implement other error reducing features, such as reassigning the n factor, to more accurately create device profiles 14, 16 and thereby enable system 10 to more accurately link color imaging devices.

As described in detail below, the color profiler implements a device model capable of adapting to subtle changes, possibly eliminating the need to create a new model for every small change to the device being modeled. In contrast to static models included within color profilers, adaptable models may save considerable time due to elimination of some of the laborious and time-intensive measurements otherwise required to create a static model, as well as elimination of steps involved in fitting the static model to these new measurements. In accordance with an embodiment of the invention, an adaptable model allows dot gain corrections and n factors to be applied to separate tristimulus color components and to separate Neugebauer primaries.

Figure 2:
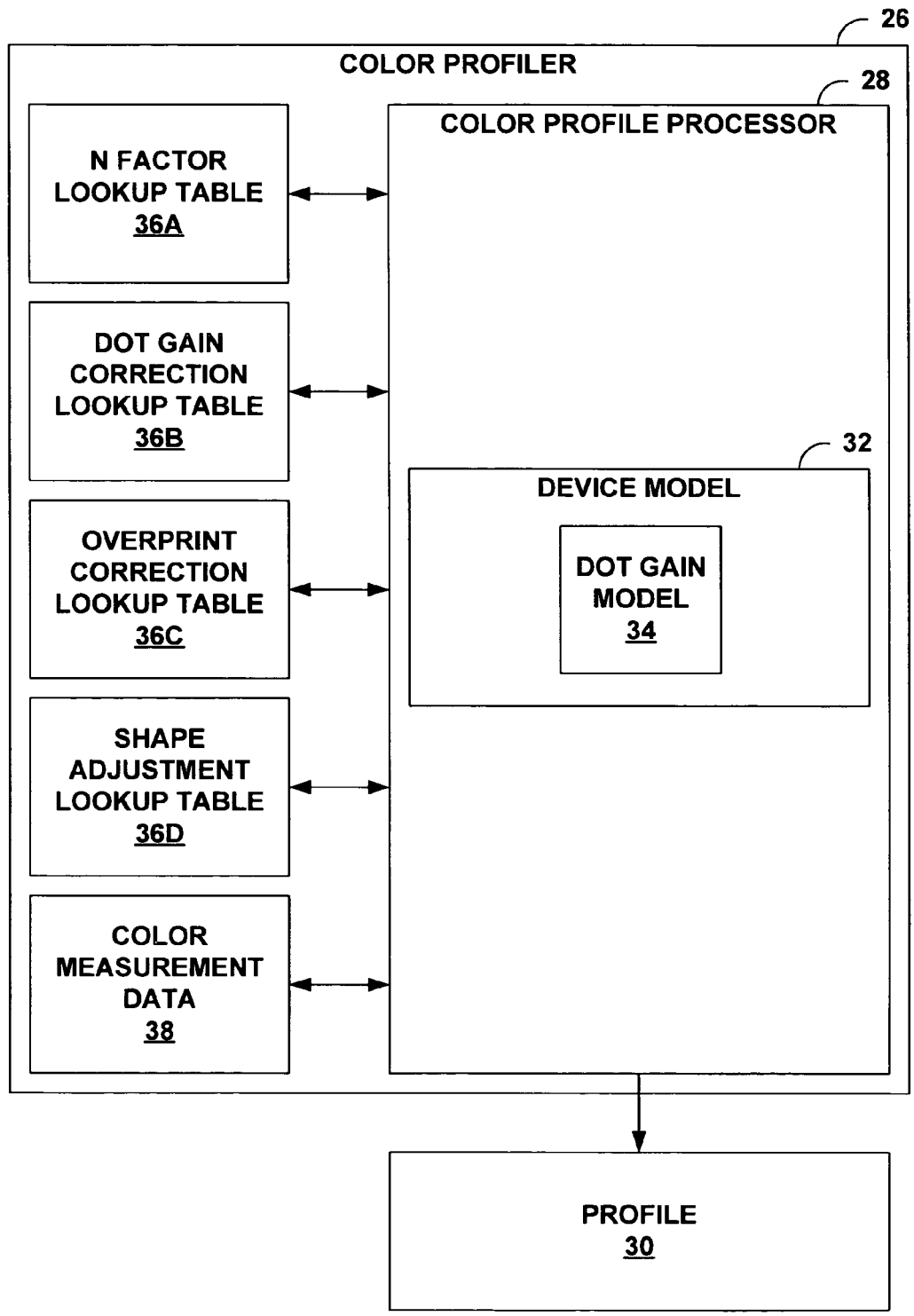
FIG. 2 is a block diagram illustrating an exemplary color profiler that implements a modified Neugebauer model in accordance with an embodiment of the invention.

FIG. 2 is a block diagram illustrating an exemplary color profiler 26 that implements a modified Neugebauer model, in accordance with an embodiment of the invention. In particular, color profiler 26 includes a color profile processor 28 to create a profile 30 for use by color management module 12 of FIG. 1. Profile 30 may correspond to any device used as a source or destination device within system 10 of FIG. 1. Color profile processor 28 may be implemented as a software process running on a general purpose computer or workstation, in any appropriate programming language, such as C, C++, or Java. In some embodiments, color profile processor 28 may be implemented with a microprocessor, digital signal processor (DSP), application specific integrated circuit (ASIC), field-programmable gate array (FPGA), or other logic circuitry.

Color profile processor 28 includes a device model 32 that implements a modified Neugebauer mixing model in accordance with an embodiment of the invention. As described in further detail below, the modified Neugebauer equations make use of a variable n factor, which is varied according to the particular Neugebauer primary under evaluation. Hence, a separate n factor may be specified for each tristimulus color component and Neugebauer primary color combination, and applied when the respective combination is evaluated.

Device model 32 further includes a dot gain model 34 that relates halftone dot variation, i.e., fringe thickness, to the size of the halftone dot, providing a variable dot gain value. In some embodiments, device model 32 may incorporate the variable n factors directly into dot gain model 34. Alternatively, modified Neugebauer equations may incorporate the n factors during Neugebauer primary color evaluation.

In some embodiments, the variable n factor and variable dot gain parameters may be implemented as a collection of values stored in a lookup table. Indices to the lookup table correspond to particular combinations of tristimulus components, Neugebauer primaries and overprint conditions under evaluation within device model 32. In the example of FIG. 2, color profiler 26 further includes lookup tables 36A-36D (collectively, "lookup tables 36") to store parameters used by device model 32 to generate profile 30.

The n factor lookup table 36A stores n factors for each Neugebauer primary and tristimulus color component combination. Dot gain correction lookup table 36B stores a dot gain correction for each Neugebauer primary and tristimulus color component combination. Overprint correction lookup table 36C stores overprint corrections for printing a first Neugebauer primary on top of a second Neugebauer primary for each tristimulus color component. Shape adjustment lookup table 36D stores a dot gain shape adjustment for each Neugebauer primary and tristimulus color component combination that may alter the response generated by dot gain model 34.

Typically, an operator calculates the values for each of lookup tables 36 and loads the values into color profiler 26 so as to store the values in respective lookup tables 36. Lookup tables 36, while discussed in the context of lookup table data structures, may comprise other data structures such as a linked list, an array, a hash table, and the like. In addition, lookup tables 36 may include a small subset of required values in some embodiments, requiring interpolation to obtain values appropriate for precise combinations.

Color profiler 26 also may include color measurement data 38 that includes measurements of Neugebauer primary color combinations obtained from a presentation of the color combinations, such as a printed page of color patches, a monitor displaying color patches, or the like. Measurement data 38 may be obtained with a conventional measurement device such as a spectrophotometer or calorimeter. Typically, the measurements may be represented in the form of device-independent color values in a standard color space, such as L*a*b*, LUV, sRBG, or CIE XYZ color spaces.

Device model 32 evaluates the modified Neugebauer equations in combination with color measurement data 38 to generate profile 30. Subsequent changes in device parameters can be handled by modifying device model 32, rather than re-measuring color patches. Prior to generating profile 30, device model 32 is typically calibrated to reduce error. Generally, device model 32 evaluates the modified Neugebauer equations using inputs stored in lookup tables 36 and color measurement data 38.

After device model 32 evaluates the modified Neugebauer equations and generates tristimulus color components for each of the Neugebauer color combinations stored in color measurement data 38, color profile processor 28 calculates an error associated with each generated tristimulus color channel value. Color profile processor 28 may calculate the error by comparing the generated tristimulus color component values to the measurements stored in color measurement data 38. An operator may then adjust device model 32 to minimize the error by adjusting the values stored in lookup tables 36. This process can continue on an iterative basis until the error is minimized, or reduced to a satisfactory degree.

Once the error is reduced, device model 32 is deemed to accurately represent the behavior of the device, given color measurement data 38. Color profile processor 28 generates profile 30 based on the most recently generated tristimulus color component values. Generally, profile 30 includes a forward transform that maps device-dependent coordinates, such as CMYK, to a device-independent color space, such as XYZ, L*a*b*, or LUV. In this manner, color profiler 26 provides device profiles that can be used by color management module 12 of system 10 (FIG. 1) to prepare color maps that link color between different devices.

The device model generated used by color profiler 26 may quickly adapt to small changes, such as a changes in paper, or ink characteristics, and may quickly create updated color profiles to match those changes, without the need for empirical measurements. For example, a device may require a change of ink that has certain characteristics having different physical or spectral properties that alter the dot gain characteristic. In response to such a change, an operator updates the values stored in lookup tables 36 such that device model 32 adapts to the change in ink, eliminating the need to create an entirely new device model.

An exemplary process for generating a color profile will now be described in greater detail. Initially, device model 32 generates an index for each of lookup tables 36 based on the Neugebauer primary and tristimulus color components currently under evaluation. Each lookup table 36 has pertinent parameter value that has been designated for the particular combination of Neugebauer primary and tristimulus color components. Color profile processor 28 accesses lookup tables 36 based on the respective calculated indices and passes the corresponding values retrieved from the lookup tables to device model 32.

Next, color profile processor 28 accesses color measurement data 38 to retrieve a Neugebauer primary color combination. Color profiler processor 28 passes the Neugebauer primary color combinations stored in color measurement data 38 to device model 32. Device model 32 calculates tristimulus color component values for each of the Neugebauer primary color combinations. In particular, device model 32 applies dot gain model 34 subject to values received from accessing dot gain correction lookup table 36B, overprint correction lookup table 36C, and shape adjustment lookup table 36D. Device model 32 also applies n factors received from n factor lookup table 36A. In some embodiments, device model 32 incorporates n factors into dot gain model 34.

Next, color profile processor 28 may calculate an error associated with each tristimulus color component calculation by comparing the calculation to the actual measurement stored in color measurement data 38 and associated with the Neugebauer primary color combination on which the calculation is based.

An operator may adjust the values stored to lookup tables 36 to minimize the error or color profiler 26 may automatically adjust the values stored to lookup tables 36 to minimize the error. Once the error is minimized and the tristimulus color channel values are recalculated using the adjusted values, color profile processor 28 generates profile 30 based on the recalculated tristimulus color component values. Generally, profile 30 includes transforms that map the tristimulus color component values generated by device model 32 to a common color space.

Figure 3:
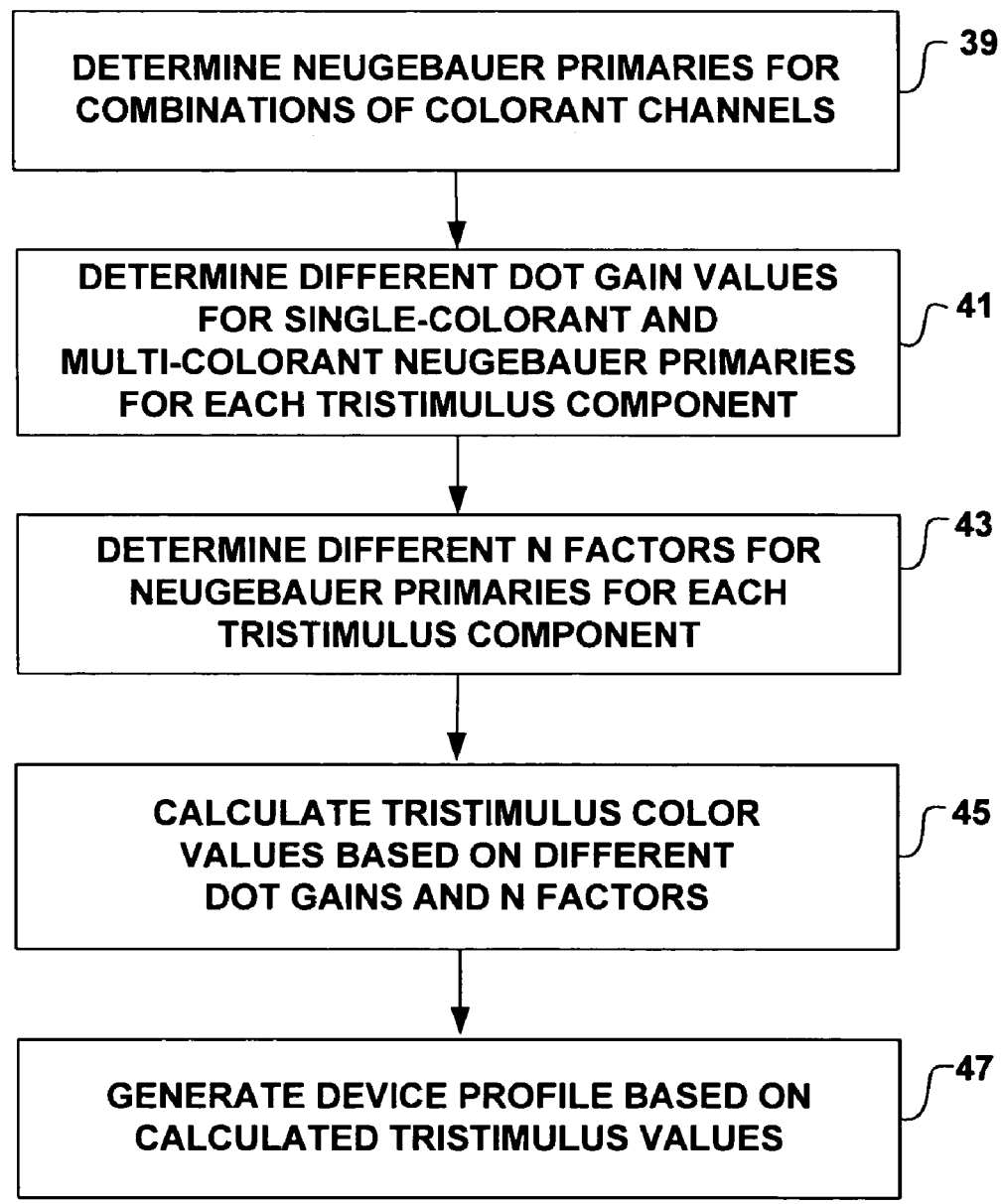
FIG. 3 is a flow diagram illustrating a technique for profiling the color response of a halftone imaging device in accordance with an embodiment of the invention.

FIG. 3 is a flow diagram illustrating a technique for profiling the color response of a halftone imaging device in accordance with an embodiment of the invention. As shown in FIG. 3, the technique involves determining Neugebauer primaries for combinations of colorant channels applied by a color imaging device (39). Different dot gain values are determined for single-colorant Neugebauer primaries and multi-colorant Neugebauer primaries (41) for each tristimulus component (RGB or XYZ), e.g., by reference to lookup tables 36 (FIG. 2).

In addition, different n factors are determined for the single-colorant Neugebauer primaries for each tristimulus channel (RGB or XYZ) (43). Tristimulus color values are calculated for different dot gain values and n factors (45) obtained from the lookup tables 36, and a profile is generated for the color imaging device based on the calculated tristimulus values (47).

It is desirable in color management to characterize the behavior of imaging systems in such as manner as to achieve both accuracy and smoothness. The accuracy is confirmed by comparing the mathematical prediction to the measured data and performing a chi-squared analysis to confirm the goodness of fit to the data. A simple way to describe a "good fit" between model and data is to say that if the squared error differences between prediction and result are comparable to the standard deviation squared of the data, the fit is "good" or "reasonable."

If the error is much lower, the model is over-determined, meaning that too many parameters are used relative to the number of data points. If the typical squared error is much larger than the square of the standard deviation, the mathematical prediction is considered a poor fit to the data.

The smoothness of the mathematical characterization is generally assured to be acceptable if the number of adjustable parameters used to perform the modeling is much smaller than the data set used to perform the fit. For example, if a quadratic equation fits a data set of 20 independent measurements, the model is assured to be smooth since it only has 3 parameters versus the 20 data points.

On the other hand, if 15 parameters are required to fit the data, smoothness is not assured. Another way to consider this rule of thumb is to consider that as a polynomial increases in order, the values of $3^{rd}$, $4^{th}$, $5^{th}$ derivatives, and so forth, become non-zero. This presence of high order derivatives is counter to the goal of "smoothness" in the mathematical model describing an imaging system.

By modifying the well-known Neugebauer color mixing model as described herein, a color profiling process is capable of using a substantially reduced number of parameters while achieving desirable fit and smoothness to measured spectral or tristimulus data. The modified Neugebauer model is similarly responsive to a variety of different data sets. In other words, the technique does not require a particular measurement data set for effective operation.

In some embodiments, a color profiler in accordance with the invention may make it possible to construct a physically based model that has the ability to predict tristimulus values for a halftone imaging device to a degree of accuracy comparable to the expected error due to uncertainties in the measurement data. In these cases, models that provide a good fit to the measurement data can be obtained without overfitting the data, i.e., making corrections to noise rather than real device behavior.

Also, constructing a device model without the need for empirical corrections permits the creation of virtual device models that tolerate small but significant changes such as changes in dot gain, changes in overprint characteristics, or the like.

The evolution of the Neugebauer color mixing model is detailed in a paper by J. A. Stephen Viggiano, entitled "Modeling the Color of Multi-color Halftones," presented in the 1990 TAGA Proceedings. In the paper, Viggiano discussed the evolution of the Neugebauer color mixing model, including the contributions of Yule and Nielsen in devising the "n factor" to account for the amount of penetration of light into paper, as well as Viggiano's own contribution in terms of applying the n factor on a narrow band spectral basis.

In addition, the Viggiano paper discusses refinements to the Neugebauer model with respect to the use of the GRL dot gain model, which characterizes differences between theoretical halftone dot size and the actual dot size that is produced upon transfer of a colorant from a printing plate to paper. Hence, there are two significant modifications to the Yule-Nielson approach made by Viggiano. The first was to modify the application of the Yule-Nielson n-factor to make use of spectral curves rather than wideband reflectances. The second was to introduce GRL dot gain. The GRL dot gain expression developed by Viggiano can be represented as follows:

$$a_p = a_f + 2\Delta_p[a_f(1-a_f)]^{1/2} \quad (1)$$

where $a_f$ is the area of a dot on film, $a_p$ is the area of a dot on paper.

Figure 4:
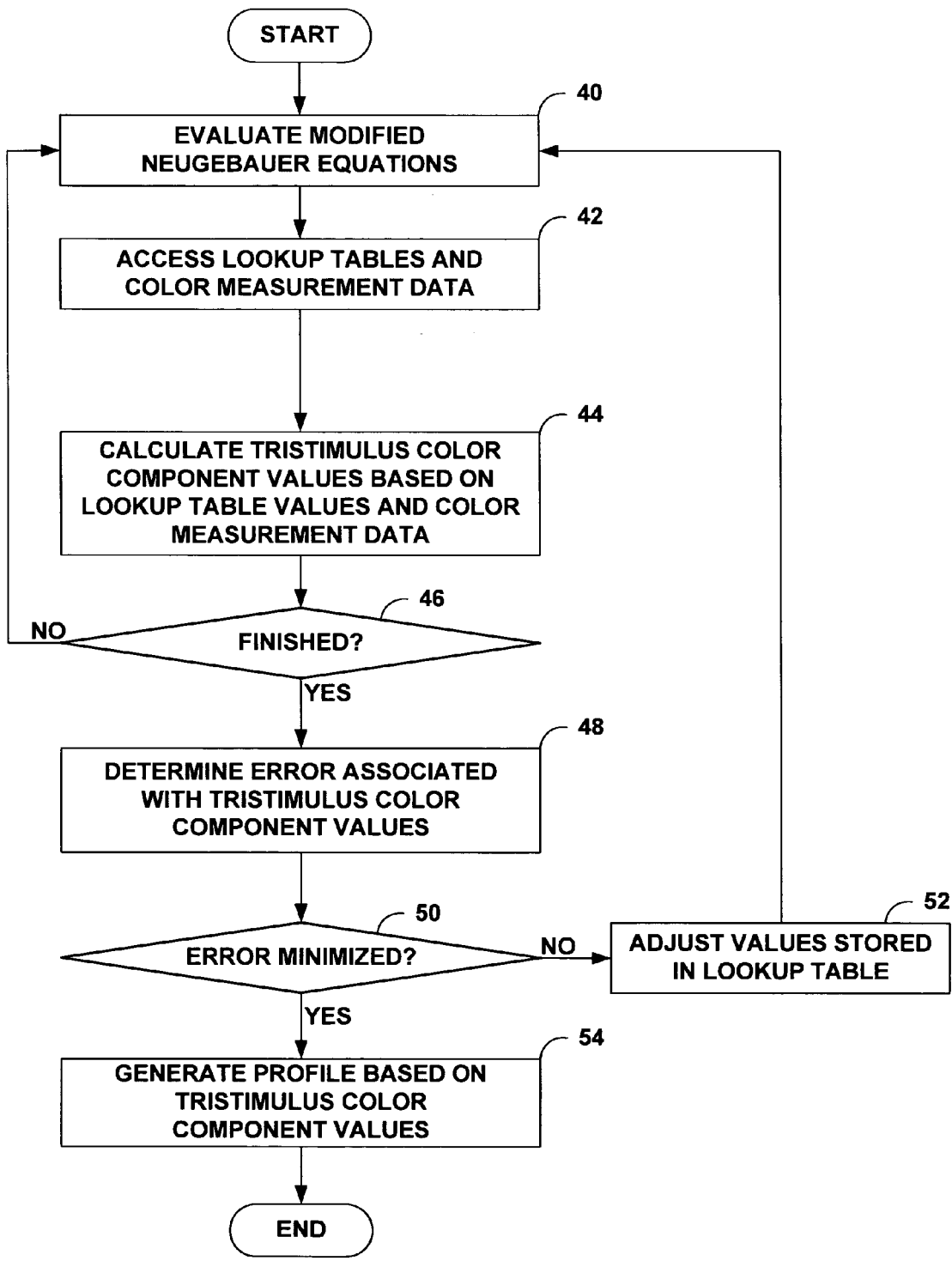
FIG. 4 is a flow diagram illustrating a technique for profiling the color response of a halftone imaging device in further detail.

FIG. 4 is a flow diagram illustrating a technique for profiling the color response of a halftone imaging device, in greater detail, in accordance with an embodiment of the invention. Initially, device model 32 evaluates the modified Neugebauer equations that define device model 32 (40) in order to generate profile 30. In evaluating the equations, device model 32 accesses lookup tables 36 and color measurement data 38 (42). To access lookup tables 36, device model 32 calculates an index into each one of lookup tables 36 based on the current tristimulus component color and Neugebauer primary combination under evaluation. In particular, device model 32 determines the parameters, such as the n factor, dot gain correction, overprint correction, and shape adjustment, that correspond to the particular Neugebauer primary and tristimulus color component combination under evaluation during the process of applying the modified Neugebauer mixing model. Such parameters are predetermined by a technician and loaded into lookup tables 36.

Device model 32 also accesses color measurement data 38 to gather Neugebauer primary color combinations. Device model 32 permits calculation of tristimulus color component values in accordance with the modified Neugebauer equations and based on the parameter values from lookup tables 36 and color measurement data 38 (44). The process of calculating tristimulus color component values continues until tristimulus color component values have been calculated for each Neugebauer primary color combination stored in color measurement data 38 (46), or at least a number of those combinations sufficient for reliable interpolation.

Once all of the tristimulus color component values have been calculated, color profiler processor 28 determines an error associated with each calculated tristimulus color component value (48). Color profile processor 28 may calculate the errors by comparing the calculated tristimulus color component value or derivative thereof, e.g., a tristimulus color component value converted to a different color space, to the measurement data corresponding to the same Neugebauer primary color combination on which the calculated tristimulus color component values are based.

In some embodiments, color profile processor 28 may calculate the errors according to chi-squared analysis, i.e., comparing the errors between the calculated values and the measurements with the expected errors due to measurement variability. Low chi-squared errors, i.e., chi-squared values of 1 or 2, indicate that errors associated with predicted values are on the same order as the errors associated with measured values. Thus, chi-squared analysis prevents over-fitting of device model 32.

Typically, device model 32 requires calibration before generating an accurate profile, such as profile 30. Thus, an operator may attempt to minimize the error or color profile processor 28 may automatically attempt to minimize the error (50), i.e., reduce the error to a satisfactory degree. In instances where an operator or color profile processor 28 attempt to minimize the error, the operator or color profile processor 28 adjusts the values stored to lookup tables 36 (52) and device model 32 recalculates the tristimulus color channel values (40, 42, 44, 46).

This process may continue on an iterative basis using conventional error minimization techniques. Once all the tristimulus color channel values are calculated, color profile processor 28 can calculate new errors associated with the recalculated tristimulus color channel values (48). This process may be repeated until it is determined that the errors are minimized. In instances where the error is determined to be minimized, color profile processor 28 generates profile 30 based on the most recently calculated tristimulus color component values (54).

Figure 5:
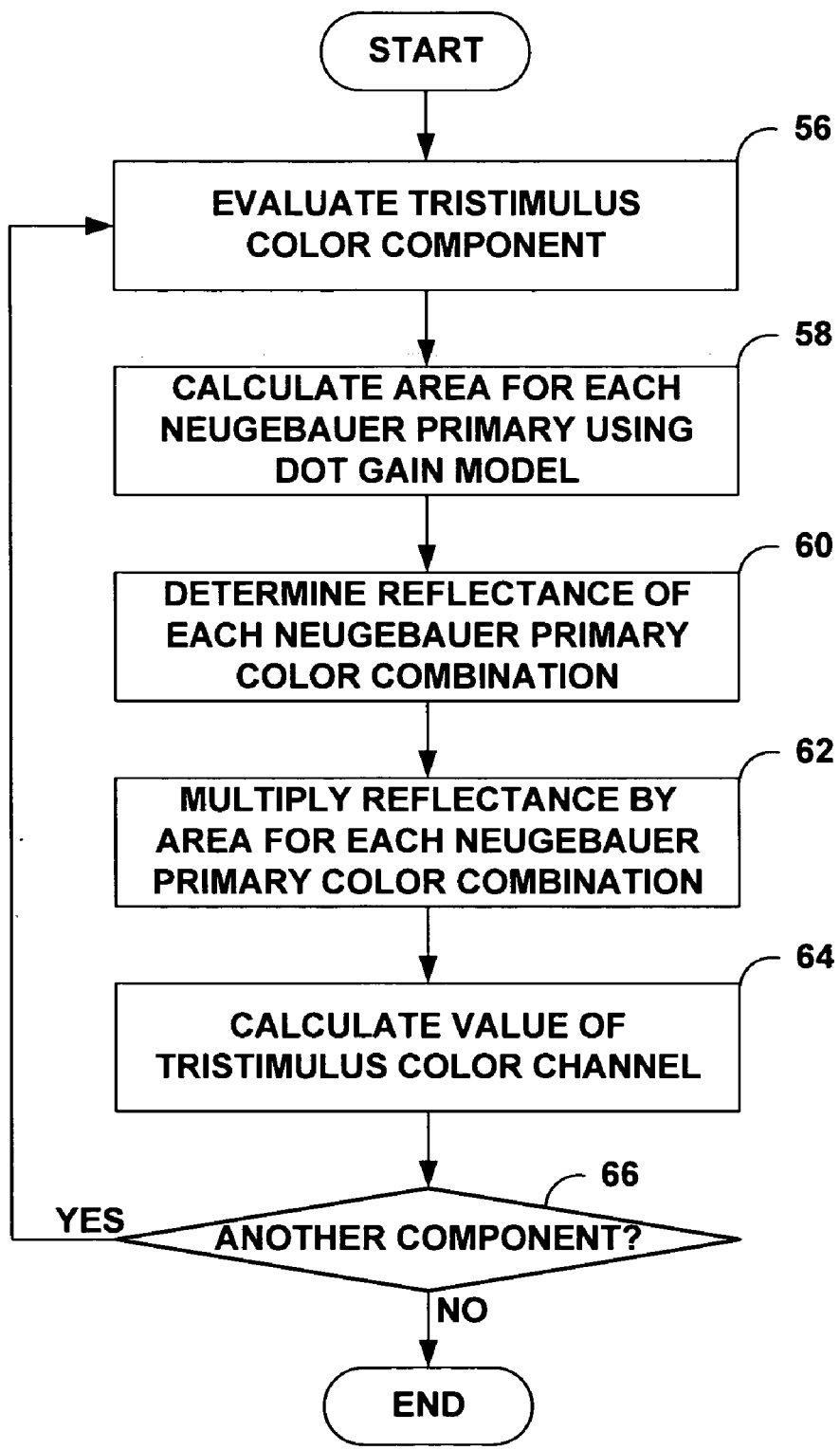
FIG. 5 is a flow diagram illustrating a technique for calculating tristimulus color channel values.

FIG. 5 is a flow diagram illustrating a technique for calculating the tristimulus color component values. As shown in FIG. 5, device model 32 calculates the tristimulus color channel values in accordance with modified Neugebauer equations, as further detailed below. Typically, device model 32 evaluates each tristimulus color component separately. In some embodiments, however, device model 32 may evaluate each tristimulus color channel concurrently.

Initially, device model 32 evaluates a tristimulus color channel (56), such as the X color component of the XYZ color space, and begins to evaluate the X color component by calculating the reflectance using a modified Neugebauer model. Device model 32 calculates the reflectance in accordance with the following equation (2):

$$R_i = \sum_{j,k,l,m=0}^{j,k,l,m=1} R_{ijklm} a_{jklm}$$

where $$R_i = X, Y, Z \quad (2)$$

for
i=0, 1, 2
j=0, 1=>C=0, 1.0
k=0, 1=>M=0, 1.0
l=0, 1=>Y=0, 1.0
m=0, 1=>K=0, 1.0 and where $R_0$ for i equal to 0 is the reflectance associated with the X tristimulus color component. Hence, index i corresponds to the X, Y, Z components of the Neugebauer equation, and indices j, k, l, and m correspond to the cyan, magenta, yellow and black color channels used to form the sixteen respective Neugebauer primaries in a four-color system. $R_{ijklm}$ is the reflectance for one of the sixteen Neugebauer primary color combinations in a four-color system, which is represented for purposes of illustration. Color systems with less or more than four colors may be used.

In the example according to equation (2), $R_{0,1,0,1,0}$ ($R_{i=0, j=1, k=0, l=1, m=1}$) is a reflectance used in the X tristimulus color component evaluation, where the reflectance is of the cyan/yellow Neugebauer primary color combination. In particular, $R_0$ (i=0) corresponds to the X component reflectance, and j=1, k=0, l=1, and m=0, corresponds to an overprint combination of cyan (represented by index j) and magenta (represented by index l). Similarly, $a_{jklm}$ measures the area of each Neugebauer primary color combination in a four-color system, in terms of the particular overprint combination indicated by the jklm (j=cyan, k=magenta, l=yellow, m=black) indices.

Device model 32 employs dot gain model 34 to correctly calculate the area of each Neugebauer primary color combination (58), i.e., one of $a_{jklm}$. Dot gain model 34 implements the following equations (2) to correctly account for dot gain for each Neugebauer primary color:

$$C \to C_{ijklm} = C + 4(\Delta_{Ci} + \delta_{Cijklm})(C^{nCi}(1.0 - C^{nCi}))^{sCi} / (4(0.25)^{sCi})$$

$$M \to M_{ijklm} = M + 4(\Delta_{Mi} + \delta_{Mijklm})(M^{nMi}(1.0 - M^{nMi}))^{sMi} / (4(0.25)^{sMi})$$

$$Y \to Y_{ijklm} = Y + 4(\Delta_{Yi} + \delta_{Yijklm})(Y^{nYi}(1.0 - Y^{nYi}))^{sYi} / (4(0.25)^{sYi})$$

$$K \to K_{ijklm} = K + 4(\Delta_{Ki} + \delta_{Kijklm})(K^{nKi}(1.0 - K^{nKi}))^{sKi} / (4(0.25)^{sKi}) \quad (3)$$

where "$n_{Ci}$" is the n factor for cyan (C) for X, Y, or Z (i=0, 1, 2), $\Delta_{Ci}$ is the dot gain correction at 50 percent for cyan for X, Y, or Z (i=0, 1, 2), $s_{Ci}$ is an optional dot gain shape adjustment parameter (default=1.0) for cyan for X, Y, or Z (i=0, 1, 2), and $\delta_{Cijklm}$ is the correction to the cyan dot gain for printing on the remaining Neugebauer primaries for X, Y, or Z (i=0, 1, 2 and all the permutations of j, k, l, m=0 or 1). Similar values are applied to magenta (M), yellow (Y), and black (K).

Dot gain model 34 instructs color profile processor 28 to access lookup tables 36 using an index based on the values of i, j, k, l, and m. Color profile processor 28 accesses lookup tables 36 and returns the values stored to lookup tables 36 to dot gain model 34. Dot gain model 34 then calculates the area of each Neugebauer primary color, e.g., cyan, to account for dot gain. In some embodiments, dot gain model 34 differs from conventional dot gain models by applying the n factor directly to the area calculation, e.g., $C^{nCi}$, and applying a separate n factor to each particular Neugebauer primary color and overprint combination under evaluation. Hence, the n factor is specific to a particular primary color, as indicated by the "C" in "$n_{Ci}$," for example. The separate n factor for each Neugebauer color combination permits device model 32 to be accurately adjusted to account for small changes to the device being modeled. Moreover, dot gain model 34 more accurately represents actual dot gain by eliminating a square root from the conventional dot gain model, as shown below.

In calculating the area, device model 32 may also assume there is no correction for a color printing on itself, e.g., producing $\delta_{Cijklm} = 0$ for all cases where j=1. Likewise, for simplicity, $\delta_{Cijklm}$ is assumed to be 0 for all m=1, i.e., no attempt is made to correct for cyan dots printing on solid black. The values of $\delta_{Kijklm}$ are typically not equal to zero for m=0, i.e., there typically is a dot gain correction for black dots printing on the remaining non-black Neugebauer primaries.

After calculating the areas, device model 32 determines the reflectance associated with each Neugebauer primary color combination, i.e., $R_{ijklm}$ (60). Device model 32 may determine the reflectances, i.e., $R_{ijklm}$, by accessing color measurement data 38, or device model 32 may calculate the reflectances in a manner similar to techniques known in the art. Once both the areas and the reflectances are calculated, device model 32 multiplies the reflectance by an associated area for each Neugebauer primary color combination (62), according to the customary Neugebauer equations, and sums the result of the multiplications to calculate the value of the tristimulus color component (X, Y, or Z) in accordance with equation (2) (64). Once the calculation is complete, device model 32 may continue to calculate the Y and Z tristimulus color channel values (66). While discussed above in the context of the XYZ color space, other color spaces and associated tristimulus color component values may be used in a similar manner and the invention should not be limited to this context.

Figure 6:
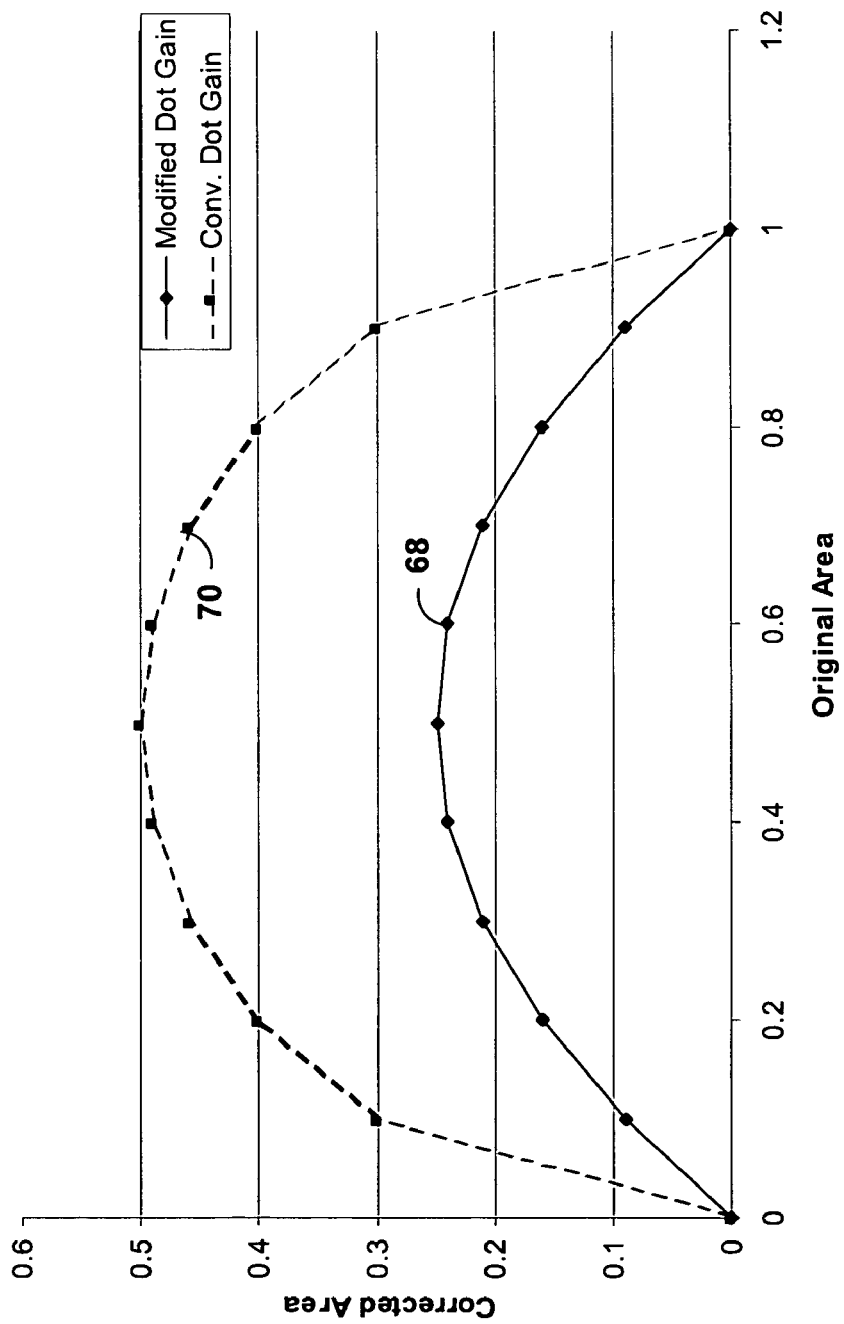
FIG. 6 is a graph illustrating a comparison between a conventional dot gain model and a modified dot gain model in accordance with the invention.

FIG. 6 is a graph illustrating a comparison between a conventional dot gain model and modified dot gain model 34. As shown in FIG. 6, graph 67 includes modified dot gain model results 68 and conventional dot gain model results 70. Conventional dot gain model results 70 are produced by a conventional GRL dot gain model, substantially as proposed by Viggiano. The modified dot gain model results 68 take advantage of modifications to the dot gain model in accordance with an embodiment of the invention.

In comparison to results 70, results 68 present a much more gradual dot gain at both of the extremes, i.e., 0 to 0.2 and 0.8 to 1. Results 68 also appear to more closely resemble measurements taken from actual dot gains and, in particular, more closely resemble measurements taken at both of the extremes. Results 70, in contrast, diverge from measurements of actual dot gains at the extremes, providing a significant source of error in conventional dot gain models.

Results 70 show that the shape produced by a conventional dot gain correction does not satisfactorily mimic the appearance of typical dot gain behavior. Instead, the plot is characterized by artificially sharp linear slopes at lower and upper dot size bounds. In accordance with the invention, a different assumption is made, namely that the width of the fringe around the halftone dot depends on the radius r of the dot.

Again, the GRL dot gain expression developed by Viggiano can be represented by equation (2), which is reproduced below:

$$a_p = a_f + 2\Delta_p [a_f(1-a_f)]^{1/2}$$

where $a_f$ is the area of dot on film, $a_p$ is the area of dot on paper. The basis for the GRL dot gain correction seems to be an assumption that the "fringe" surrounding a halftone dot is of constant thickness "$\Delta r$" where "r" is the radius of the halftone dot. In other words, it assumes $\Delta r$ is a constant independent of r. This type of assumption does indeed lead to a correction that increases according to the square root of $a_f$ for $a_f \ll 1$, i.e., $a_f^{1/2}$.

According to the invention, a simple estimate, such as assuming that $\Delta r/r$ is constant, i.e., that the fringe width is proportional to dot radius r, results in an expression that predicts that the correction to the area $a_f$ for $a_f \ll 1$ rises linearly with $a_f$. The expression for dot gain correction in accordance with the invention is similar to the conventional expression, but without the square root as follows:

$$a_p = a_f + 4\Delta_p [a_f(1-a_f)] \quad (4)$$

A dot gain characterization using a modified Neugebauer model that assumes fringe variation is a function of dot size can enhance accuracy. In particular, as indicated by results 68, the shape of the modified dot gain correction is more reminiscent of typical dot gain behavior on a halftone printing press.

Results 68 may be attributed to a heuristic approach to reducing error that eventually leads to equations (2) and (3), above. By modifying the conventional dot gain equation so as to reduce dot gain error, dot gain model 34 implements an equation similar in form to equation (4) above, where a is the area of the dot on paper, a is the area of the dot on film, and $\Delta_p$ is the amount of dot gain when $a_f = 0.50$ or 50 percent.

Contrary to conventional dot gain models, such as the GRL dot gain model, a dot gain model 34 in accordance with the invention does not take the square root of any of the factors, which leads to a more accurate representation of dot gain. Dot gain model 34 does not assume that halftone dot variation, i.e., "fringe," is a constant thickness regardless of dot radius, and instead assumes that fringe width is proportional to dot radius, in accordance with an embodiment of the invention. Dot gain model 34 characterizes and implements this assumption by removing the square root from the conventional dot gain model, which leads to linear equation (4) and a reduction in associated error when predicting dot gain.

It is interesting to observe the nature of both the n-factor and the dot gain parameters relative to the intrinsic variable "k," which is the area of a black dot as an example. Consider the simplified case of a perfectly absorbing black ink printed on a perfectly reflective paper (spectrally speaking). The equations from Yule-Nielsen and Viggiano both reduce to:

$$R = [(1-k)R_p^{1/n} + kR_k^{1/n}]^n$$

$$R = (1-k)^n \quad (5)$$

Note that this last expression is the subtractive system equivalent of a classic gamma curve behavior in an emissive system such as a cathode ray tube (CRT), where "n" corresponds to "gamma."

Figure 7:
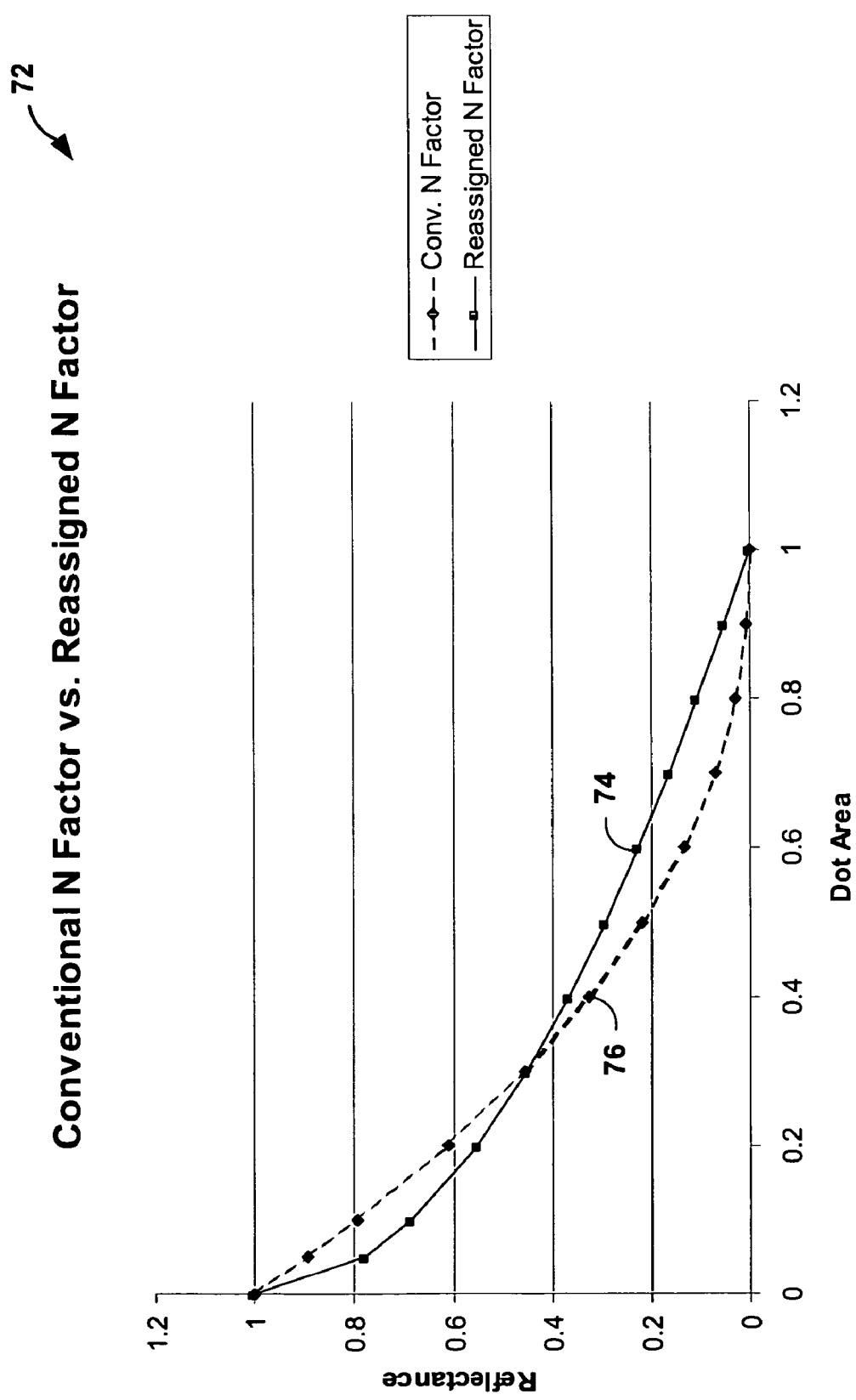
FIG. 7 a graph illustrating a comparison between a conventional device model and a modified device model in terms of reflectance versus dot area.

FIG. 7 a graph illustrating another comparison between a conventional device model and a modified device model 32, in accordance with an embodiment of the invention. As shown in FIG. 7, graph 72 includes modified device model results 74 and conventional device model results 76 in terms of predicted dot area and reflectance. In particular, graph 72 defines the X-axis as the predicted dot area by the device models and the Y-axis as the predicted reflectance.

Device model 32 generates results 74 by utilizing a modified dot gain model 34, as described herein, and reassigning the n factor so that the n factor applies directly to the area of a pertinent dot, e.g., black dot area k. Device model 32 may implement an equation similar to the following equation (6):

$$R = [(1-k^n)R_p + k^n R_k] \quad (6)$$

where R is the total reflectance, k is the area of the black (for purposes of example) Neugebauer primary color, $R_p$ is the reflectance associated with the paper on which the colorant is deposited or otherwise formed, $R_k$ is the reflectance associated with the black ink, and n is the applicable n factor. Equation (6) is a simplified version of equations (2) and (3) in that equation (6) only takes into account the black Neugebauer primary for purposes of illustration, while equations (2), (3) are tailored to predict values for a four-color system.

Equation (6) assigns the Yule-Nielson n factor directly to the area of the Neugebauer primary color, e.g., to the black area k, similar to equation (3), which also assign n factors directly to the areas of the Neugebauer primary colors. Based on these reassignments of n factors, the slope of results 74 is increased between the dot area range of 0.0 to 0.2 when compared against results 76. As shown, the reassignment of the n factor may reduce error, and more particularly, reduce the error near the dot area range of 0.0 to 0.2. Again, a heuristic approach may be applied to reduce the error associated with device model 32 and may facilitate formulation of equation (6). Thus, in effect, equation (6) may lead to equations similar to equations (2) and (3) through the extension of equation (6) to a four-color system. In this manner, device model 32 may more accurately model a device.

Figure 8:
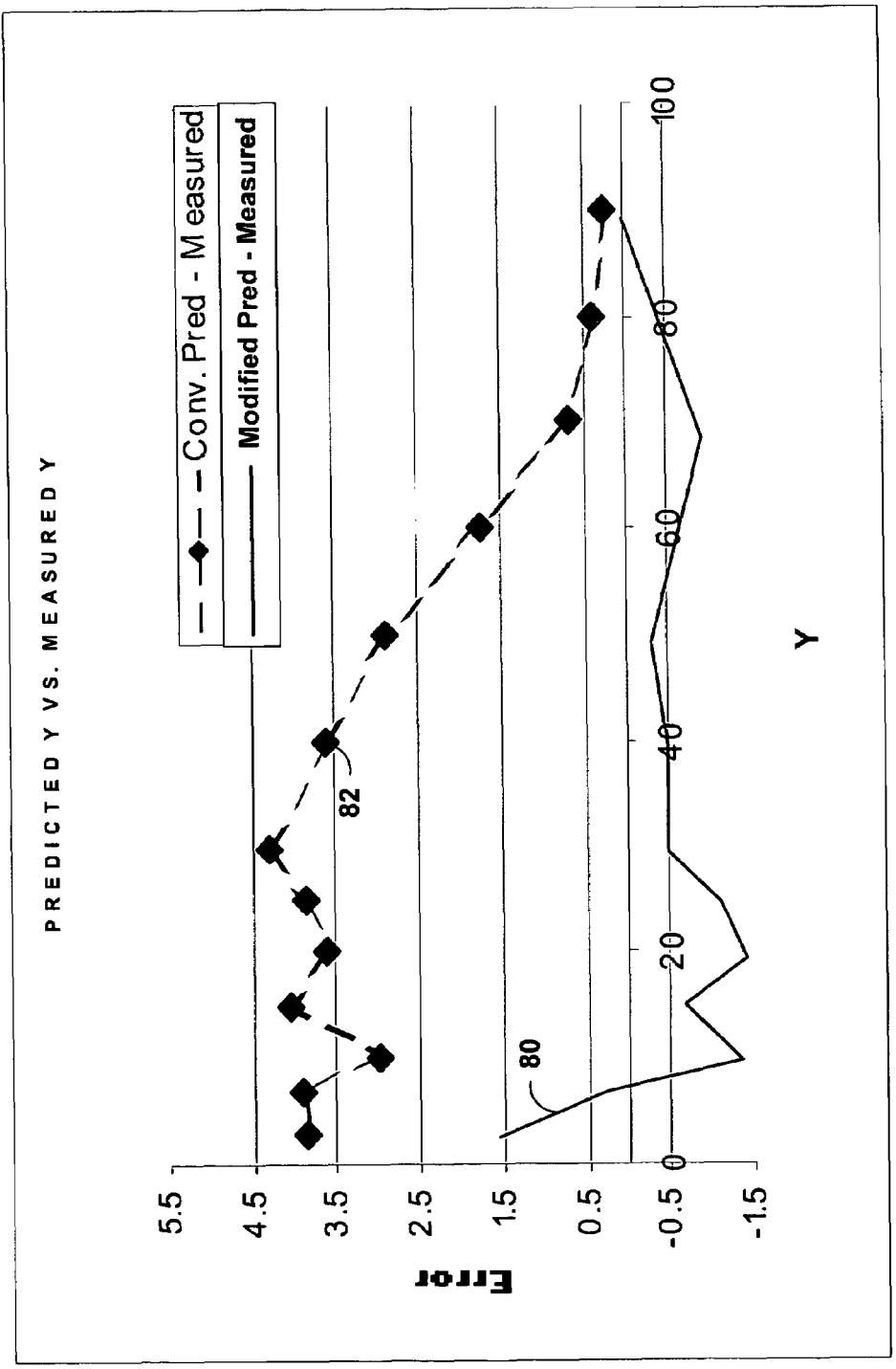
FIG. 8 is a graph illustrating error associated with a conventional device model and a modified device model in accordance with the invention in terms of predicted versus measured Y values.

FIG. 8 is a graph illustrating error associated with a conventional device model and modified device model 32. In particular, graph 78 includes error 80 that defines error associated with predicted Y values generated by modified device model 32 and error 82 that defines error associated with predicted Y values generated by a conventional device model. Both errors 80, 82 are calculated using chi-squared analysis, i.e., subtracting the predicted Y values from the measured Y values stored in color measurement data 38 and then comparing the subtracted result with the expected errors due to measurement variability. Thus, the y-axis of graph 78 represents the chi-squared error value and the x-axis represents the Y values.

As shown in FIG. 8, error 80 for a modified device model, in accordance with the invention, is reduced in comparison to error 82 for a conventional device model. The reduction to error 80 is due to the reassignment of the n factor, which increases the slope of results 74 as described above, and in turn lessens the error near the Y values close to zero. Again, device model 32 more accurately predicts tristimulus color component values when compared to conventional device models.

Figure 9:
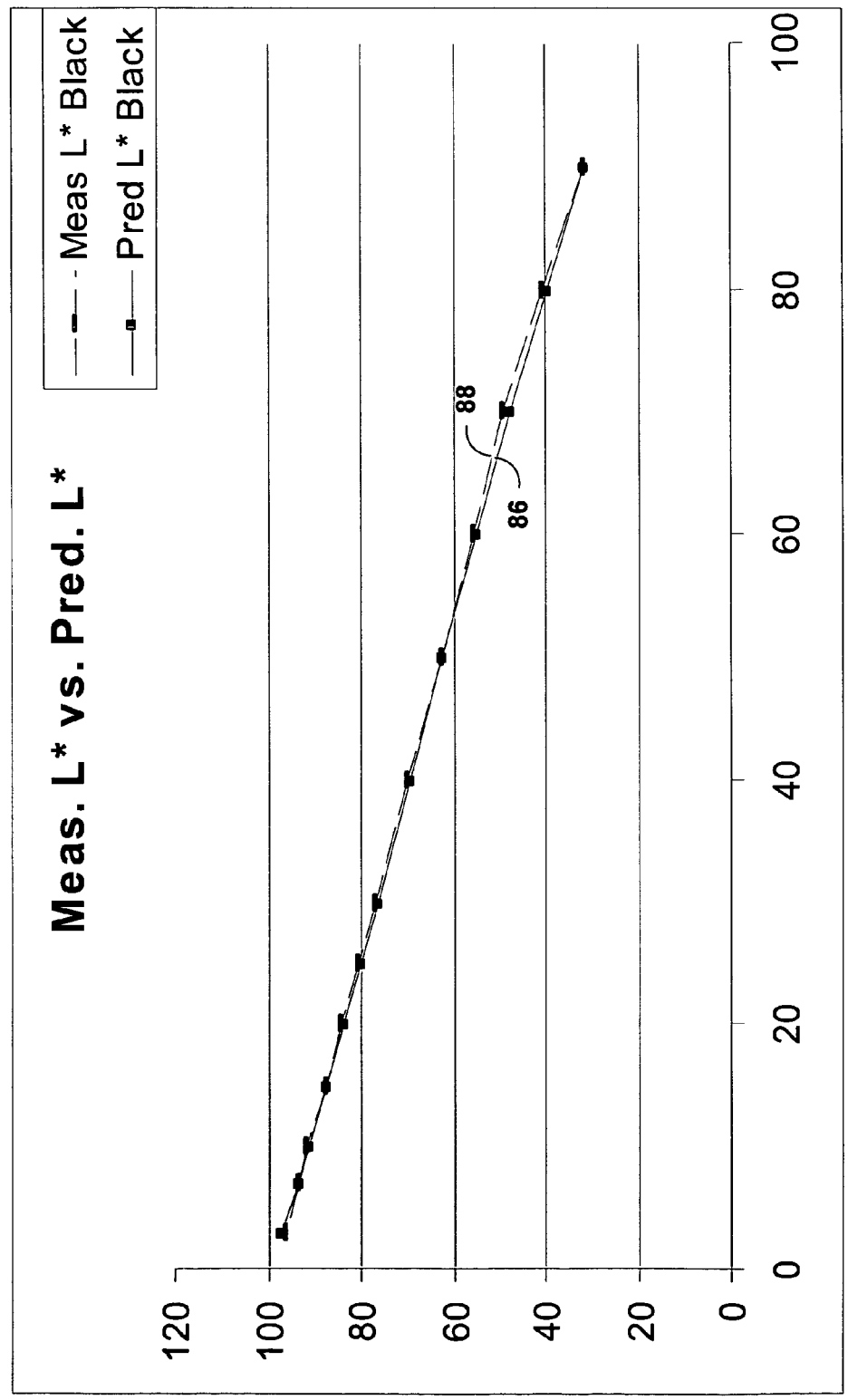
FIG. 9 is a graph illustrating the accuracy of values generated by a device model in accordance with an embodiment of the invention.

FIG. 9 is a graph illustrating the accuracy of values generated by device model 32. Device model 32 generates tristimulus color component values using equations (2), (3). In some embodiments, device model 32 may be used to generate tristimulus color values for the L*a*b* color space. Graph 84 includes L* values 86 that are generated by device model 32 (FIG. 2) as well as L* values 88 that are stored in a set of color measurement data 38. L* values 88 represent measurements taken from color patches. As shown in FIG. 9, device model 32 generates L* values 86 that accurately predict expected values, i.e., actual measurement L* values 88.

Figure 10:
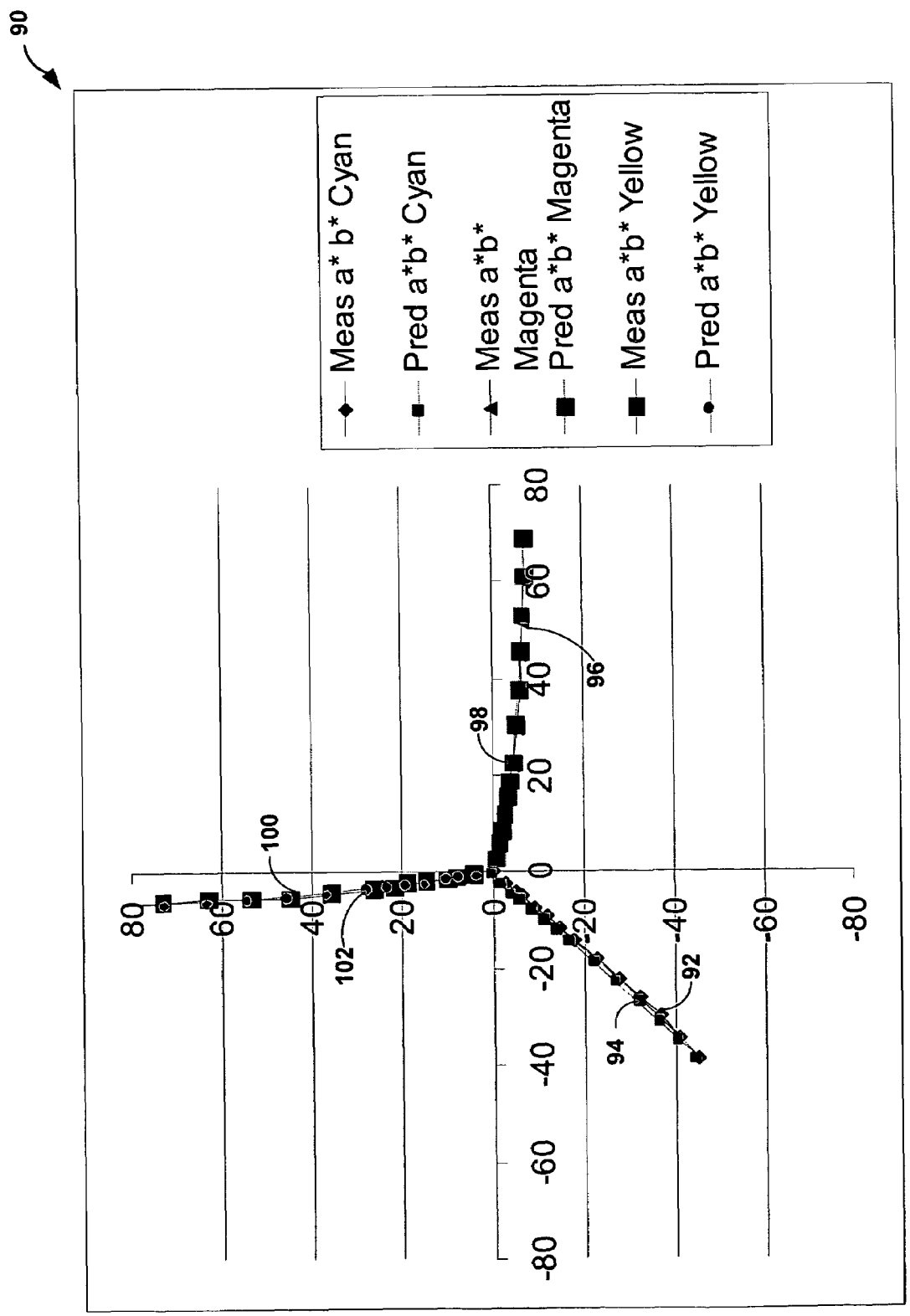
FIG. 10 is a graph further illustrating the accuracy of values generated by a device model in accordance with an embodiment of the invention.

FIG. 10 is a graph further illustrating the accuracy of values generated by device model 32. As shown in graph 84 of FIG. 9, device model 32 accurately predicted L* values 88. However, accurate prediction of L* values may not be conclusive of complete accuracy. As shown in graph 90, device model 32 further provides accuracy when computing the a* and b* values for each of the Neugebauer primary colors excluding black. Since device model 32 provides separate n factors and dot gain corrections for each color channel and Neugebauer primary color, device model 32 may more accurately predict tristimulus color channel values.

Graph 90 includes measured a*b* cyan values 92, predicted a*b* cyan values 94, measured a*b* magenta values 96, predicted a*b* magenta values 98, measured a*b* yellow values 100, and predicted a*b* yellow values 102. Each color pair of measured and predicted values extends in a different direction from the zero point of graph 90. As shown in FIG. 10, all of predicted values 94, 98, 102 appear accurate when compared to measured values 92, 96, 100. As depicted in graph 78 (FIG. 8), device model 32 (FIG. 1) reduces error which in turn provides for accurate prediction of both L* values, as shown by graph 84 of FIG. 9, and a*b* values.

In this manner, a color profiler, such as color profiler 26, may implement a more accurate device model, such as device model 32. In particular, the device model may incorporate a modified dot gain model, such as dot gain model 34, to more accurately reflect the behavior of ink when printing paper.

In summary, the modified dot gain model may implement a linear equation to characterize dot gain as being dependent on the size of the dot, such that fringe thickness is related to the radius of the halftone dot. The device model may further reassign the n factor so as to directly apply the n factor to the size of the dot, as described above. The modified dot gain model may incorporate the n factor to more accurately characterize the dot gain. The device model reassigns the n factor due in part to areas of high error associated with conventional device models.

While providing a more accurate device model, the device model also allows an operator to adjust the device model in response to small changes in the device being modeled. The operator may adjust the values stored to lookup tables, such as lookup tables 36, or some other data structures, to adjust the device model. The operator may adjust the device model in this manner because the device model applies separate n factors, dot gain corrections, overprint corrections and shape adjustments, for each Neugebauer primary color and tristimulus color channel pair. Thus, a change to a single ink color may be accounted for by adjusting the values stored in the lookup tables pertinent to the single ink color. Therefore, a device model consistent with the principles of the invention may possibly eliminate the necessary measurements and time required to create a new model that reflects the small changes to the device being modeled.

The method for determining a color profile is described above. This method may be contained in a computer-readable medium comprising instructions to cause a processor to determine different dot gain values for single-colorant Neugebauer primaries when forming single-colorant combinations and when forming multi-colorant combinations for each tristimulus color component. Tristimulus color channel values are calculated based on the different dot gain values to characterize the color response of a halftone imaging device. The instructions may also cause the processor to determine different n factors representing light penetration into a substrate for the Neugebauer primaries for each tristimulus color component.

In another embodiment, instructions cause the processor to apply one of the different n factors directly to a halftone dot value associated with the single-colorant Neugebauer primaries for each of the tristimulus color channels. In yet another embodiment, instructions cause the processor to determine different dot gain corrections for the single-colorant Neugebauer primaries, and applying the dot gain corrections to adjust the dot gain values. In a further embodiment, the instructions cause the processor to determine different overprint correction parameters to adjust the dot gain values for the single-colorant Neugebauer primaries when printing on the remaining single and multi-colorant Neugebauer primaries. The instructions may also cause the processor to determine a shape adjustment parameter to adjust a shape of a dot gain curve for each of the tristimulus color components. In an additional embodiment, the instructions cause the processor to generate a profile for the imaging device based on the calculated tristimulus color values. In yet another embodiment, the instructions that cause the processor to generate the profile cause the processor to generate a mapping of device-dependent coordinates to device-independent coordinates. The instructions may also cause the processor to generate a link between the halftone color imaging device and another imaging device based at least in part on the profile. In one embodiment, the instructions cause the processor to determine the tristimulus color values includes determining XYZ tristimulus color values. In yet another embodiment the instructions cause the processor to determine the tristimulus color channel values includes determining L*a*b* tristimulus color values. In a further embodiment, the instructions that cause the processor to determine the dot gain values as a function of the size of a halftone dot. The colorant channels may include cyan, magenta and yellow or cyan, magenta, yellow and black.

In one embodiment, a computer-readable medium comprises instructions to cause a processor to determine a dot gain value by applying an n factor to a size of a halftone dot. A profile is generated based on the dot gain value that characterizes the color response of a halftone imaging device. One-dimensional properties of dot gain are described as a function of input dot value via a quadratic expression, wherein the input dot value is adjusted by applying an exponential factor.

In a further embodiment, a computer-readable medium comprises instructions to cause a processor to determine Neugebauer primaries for combinations of colorant channels applied by a halftone color imaging device. Different dot gain values for single-colorant Neugebauer primaries are determined when forming single-colorant combinations and when forming multi-colorant combinations for each tristimulus channel (XYZ or RGB). Different n factors are determined for the single-colorant Neugebauer primaries for each tristimulus channel (XYZ or RGB). Dot gain corrections to the dot gain values are determined for the single-colorant Neugebauer primaries when printing on the remaining single and multi-colorant Neugebauer primaries.

A number of embodiments of the present invention have been described. Nevertheless, it will be understood that various modifications may be made without departing from the spirit and scope of the invention. Accordingly, other embodiments are within the scope of the following claims.

The invention claimed is:

1. A method for transforming image data values associated with a halftone imaging device, the method comprising:

defining a mathematical model based on Neugebauer equations that converts dot size input values for a plurality of printing inks to tristimulus values;

defining a dot gain function that converts input dot sizes into adjusted output dot sizes based on a value of a dot gain parameter wherein the dot gain function is characterized by a dot gain parameter value representing a maximum gain for an intermediate input dot size and no gain for minimum and maximum input dot sizes;

adjusting dot size values for each dot size input value used in said Neugebauer calculations by means of said dot gain function and said dot gain parameter;

determining a single dot gain parameter value, for use in the dot gain function, for each single-colorant Neugebauer primary that characterizes the relationship of dot size input values to measured tristimulus values for each single colorant ink;

determining a unique correction value for a dot gain parameter for each single colorant Neugebauer primary associated with printing that single colorant Neugebauer primary on each of the remaining Neugebauer primaries that do not contain said single colorant Neugebauer primary;

calculating tristimulus color values as a function of the dot sizes of said plurality of printing inks and the dot gain function to characterize a color response of the halftone imaging device;

generating a profile based on the color response of the halftone imaging device;

performing one or more of the following steps:

adapting color values for use with the halftone imaging device based on the profile;

printing the adapted color values on the halftone imaging device; and preparing color values for a different device based on the profile wherein the color values are converted from color values intended for the halftone imaging device.

2. The method of claim 1, wherein generating the profile includes generating a mapping of device-dependent coordinates to device-independent coordinates.

3. The method of claim 2, further comprising generating a link between the halftone color imaging device and another imaging device based at least in part on the profile.

4. The method of claim 1, wherein determining the tristimulus color values includes determining XYZ tristimulus color values.

5. The method of claim 1, wherein determining the tristimulus color channel values includes determining L*a*b* tristimulus color values.

6. The method of claim 1, wherein determining the dot gain values includes determining the dot gain values as a function of the size of a halftone dot.

7. The method of claim 1, wherein the colorant channels include cyan, magenta and yellow.

8. The method of claim 1 wherein converting image data with said profile for output on a display system or printing system.

* * * * *